United States Patent Office 3,223,244
Patented Dec. 14, 1965

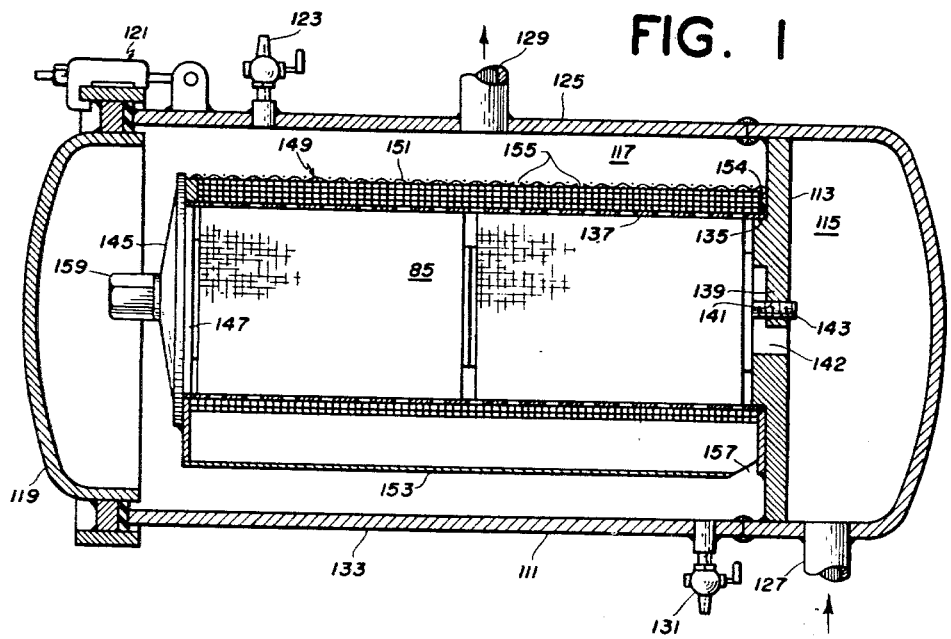

3,223,244
FILTER AND DEHYDRATOR
George J. Topol, Hamilton, Ontario, and Leslie B. Baranowski, Burlington, Ontario, Canada, assignors to Bowser, Inc., Fort Wayne, Ind., a corporation of Indiana
Original application Mar. 1, 1955, Ser. No. 491,434, now Patent No. 2,953,249, dated Sept. 20, 1960. Divided and this application Dec. 29, 1959, Ser. No. 470
2 Claims. (Cl. 210—247)

This application is a division of our copending application Serial Number 491,434, filed March 1, 1955 and now U.S. Patent No. 2,953,249.

This invention relates to a filter and separator for liquids, especially emulsified liquids, and is particularly adapted for removing contaminant and water from a water in oil emulsion which may be present in such liquids as JP-4 jet fuel, gasoline, fuel oil, diesel fuel, kerosene and other similar products.

It is an object of the invention to provide a cartridge which has a high dirt holding capacity and which can be readily replaced by a new cartridge when the original cartridge becomes fouled or otherwise rendered inoperative.

Another object of the invention is the provision of a cartridge which will efficiently handle liquids under high flow rate.

Another object of the invention is the provision of a filter and separator horizontal unit for applications where space and height limitations are of primary importance.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

FIGURE 1 is a vertical sectional view of a filter-dehydrator in which the unit is in a horizontal position;

FIGURE 2 is a vertical sectional view of a water trap adapted to be used with the filter-dehydrator unit illustrated in FIGURE 1.

Referring to FIGURE 1 in the drawing which illustrates a horizontal filter-dehydrator, the reference numeral 111 designates a tank provided with a wall or partition 113 to form an inlet chamber 115 and an effluent chamber 117. The cover 119 and clamping means 121 are constructed in the same manner as illustrated in Patent 2,953,249 except for the vent 123 which is inserted in the top wall 125 of the tank.

The inlet conduit 127 is connected at one end to the inlet chamber 115 and at the other end with a pump or other source of fuel under pressure (not shown). An outlet conduit 129 connected to the chamber 117 is provided in the top wall 125 of the tank and a drain 131 connected to the chamber 117 is disposed in the bottom wall 133 substantially adjacent the wall 113.

The partition 113 is provided with a concentric, circular boss 135 for receiving one end of the cage 137. The partition is provided with a web 139 having a tapped hole 141 for receiving one end of the rod 143. The cap 145 has a concentric, circular boss 147 for receiving the other end of the cage 137. The cartridge 85 is constructed in the same manner as shown and described in Patent No. 2,953,249. A cylinder 149 having an upper portion 151 of screen wire and a bottom portion of solid material to form a trough 153 is disposed around the cage 137 and spaced therefrom by an inturned flange 154. The cylinder is provided with openings or holes 155 in the upper portion to prevent formation of air pockets and an opening 157 forming an outlet in the trough. The parts are held in assembled relationship by the rod 143 and nut 159.

The cylinder 149 may be provided with a water trap 161 as illustrated in FIGURE 2.

In the operation of the horizontal filter-dehydrator, the fuel including contaminants, water and water emulsion, is delivered under pressure through the conduit 127 into the chamber 115, through opening 142 into the interior of the cartridge 85. The cartridge performs the same dual function as described in Patent No. 2,953,249. After passing through the cartridge, the liquid flows through the cage 137 to the interior of the screen cylinder 149 where the water particles coalesce into large drops of water and then fall by gravity to the trough 153. The water from the trough 153 flows through the opening 157 to the bottom of the chamber 117 and out the drain 131. The drainage of water may be simplified by mounting the tank on a slight slope of one or two degrees.

The treated fuel flows through the screen 151 into the upper portion of the chamber 117 and out the conduit 129.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desired protection falling fairly within the scope of the appended claims.

We claim:
1. In a fuel and water separator comprising a horizontal disposed tank, a vertical partition having an opening and mounted within the tank adjacent one end to separate the tank into first and second chambers, means for positioning within the tank a filter-separator unit including a coalescer element mounted horizontally with respect to the partition with its interior connected for fuel flow with the opening in said vertical partition, said positioning means including a cylinder having an upper screen portion pervious to oil and nonpervious to water surrounding and spaced from the coalescer element, said cylinder having a lower nonpervious solid portion with an opening at one end for forming a trough to convey the separated water to a predetermined area in the second chamber, an inlet means communicating with the first chamber, a fuel outlet means communicating with the upper portion of the second chamber, and a water drain connected to the lower portion of said second chamber.

2. A fuel and water separator as set forth in claim 1, including means defining a water trap adjacent the opening in the trough.

References Cited by the Examiner
UNITED STATES PATENTS

| Re. 24,136 | 4/1956 | Marvel | 210—307 |
|---|---|---|---|
| 2,374,976 | 5/1945 | Briggs et al. | 210—345 |
| 2,390,494 | 12/1945 | Briggs et al. | 210—323 |
| 2,440,487 | 4/1948 | Rayburn | 210—345 |
| 2,548,568 | 4/1951 | Swank | 210—307 |
| 2,657,808 | 11/1953 | Mankin | 210—307 |
| 2,757,803 | 8/1956 | Robinson | 210—316 |
| 2,829,774 | 4/1958 | Muller | 210—307 X |
| 2,883,345 | 4/1959 | Taylor | 210—23 X |
| 2,953,249 | 9/1960 | Topol et al. | 210—315 X |
| 3,048,275 | 8/1962 | Headrick | 210—307 X |

FOREIGN PATENTS
1,083,869   6/1954   France.

REUBEN FRIEDMAN, *Primary Examiner.*
HERBERT L. MARTIN, HARRY B. THORNTON, HERMAN BERMAN, *Examiners.*